United States Patent
Tsukamoto

(10) Patent No.: US 10,658,804 B2
(45) Date of Patent: May 19, 2020

(54) BRANCHING STRUCTURE AND WIRE HARNESS

(71) Applicant: YAZAKI CORPORATION, Tokyo (JP)

(72) Inventor: Masashi Tsukamoto, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 19 days.

(21) Appl. No.: 15/794,558

(22) Filed: Oct. 26, 2017

(65) Prior Publication Data

US 2018/0123301 A1    May 3, 2018

(30) Foreign Application Priority Data

Oct. 27, 2016  (JP) ................................ 2016-210509

(51) Int. Cl.
*H01R 25/16*  (2006.01)
*H01R 4/48*   (2006.01)
(Continued)

(52) U.S. Cl.
CPC ....... *H01R 25/162* (2013.01); *B60R 16/0215* (2013.01); *H01R 4/4818* (2013.01);
(Continued)

(58) Field of Classification Search
CPC ..................................................... B60R 16/02
(Continued)

(56) References Cited

U.S. PATENT DOCUMENTS 5,018,044 A * 5/1991 Weiss ...................... A61N 1/14
                                                        361/212
5,735,716 A * 4/1998 Bilezikjian .......... H01R 13/187
                                                        439/843
(Continued)

FOREIGN PATENT DOCUMENTS

| JP | 61-123618 U    |   | 8/1986  |            |
|----|----------------|---|---------|------------|
| JP | 6-28727 Y2     |   | 8/1994  |            |
| JP | 2006-294486    | * | 10/2006 | ... H01R 4/24 |
| JP | 2006-294486 A  |   | 10/2006 |            |
| JP | 2015-227089 A  |   | 12/2015 |            |
| JP | 2016-147558 A  |   | 8/2016  |            |

OTHER PUBLICATIONS

Communication dated Dec. 25, 2018, issued by the Japanese Patent Office in counterpart Japanese Patent Application No. 2016-210509.

*Primary Examiner* — Stanley Tso
(74) *Attorney, Agent, or Firm* — Sughrue Mion, PLLC

(57) ABSTRACT

A wire harness includes a main line harness, a branch line harness, and a branching structure configured to connect the main line harness and the branch line harness to each other. The main line harness has a plurality of main lines arranged side by side. Each main line is configured as a wiring member having a rod conductor. The branch line harness has a plurality of branch lines. The branching structure includes connection terminals to be electrically connected to the main lines to form at least part of electrically conductive paths between the main lines and the branch lines. Each connection terminal has a tubular connection portion to cover an outer circumferential surface of the rod conductor. The tubular connection portion has a pressing structure configured to elastically press the outer circumferential surface of the rod conductor placed inside a hollow portion of the tubular connection portion.

18 Claims, 12 Drawing Sheets

(51) Int. Cl.
*H01R 9/24* (2006.01)
*H01R 12/53* (2011.01)
*B60R 16/02* (2006.01)
*H01R 13/11* (2006.01)
*H02G 3/08* (2006.01)
*H02G 3/16* (2006.01)
*H02G 3/32* (2006.01)

(52) U.S. Cl.
CPC ........... *H01R 9/2416* (2013.01); *H01R 12/53* (2013.01); *H01R 13/111* (2013.01); *H02G 3/08* (2013.01); *H01R 2201/26* (2013.01); *H02G 3/16* (2013.01); *H02G 3/32* (2013.01)

(58) Field of Classification Search
USPC ......................................................... 174/520
See application file for complete search history.

(56) References Cited

U.S. PATENT DOCUMENTS

| | | | |
|---|---|---|---|
| 7,271,987 B1* | 9/2007 | Zhang | H01H 83/14 335/18 |
| 2008/0153321 A1* | 6/2008 | Trussel | H01L 25/072 439/68 |
| 2013/0256029 A1* | 10/2013 | Toyama | B60R 16/0207 174/72 A |
| 2014/0103715 A1* | 4/2014 | Ito | B60R 16/0207 307/24 |
| 2014/0287621 A1* | 9/2014 | Smutny | H01R 31/08 439/574 |
| 2015/0349471 A1 | 12/2015 | Maki et al. | |
| 2017/0012414 A1* | 1/2017 | Gong | H02G 1/1209 |

\* cited by examiner

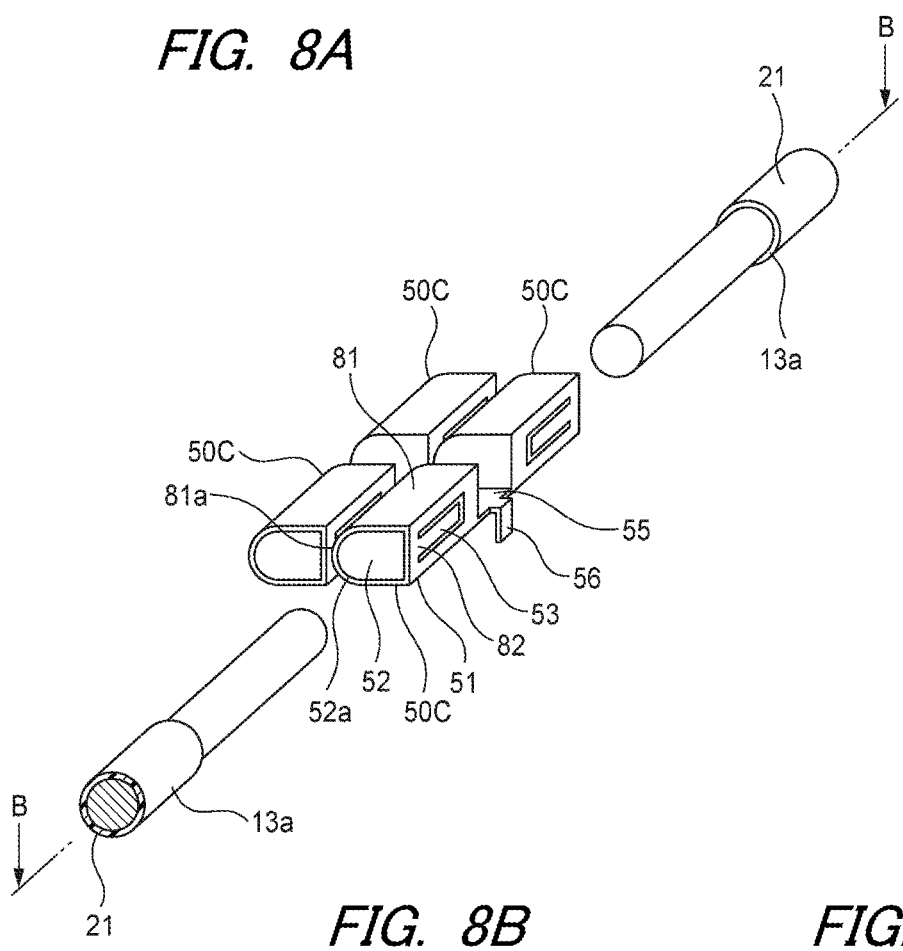
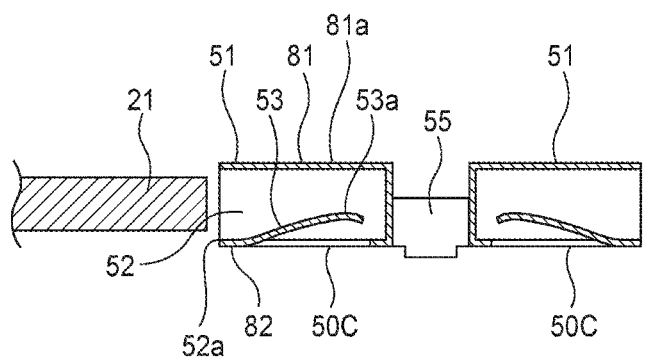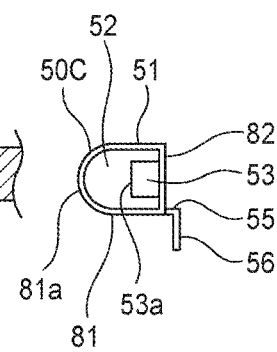
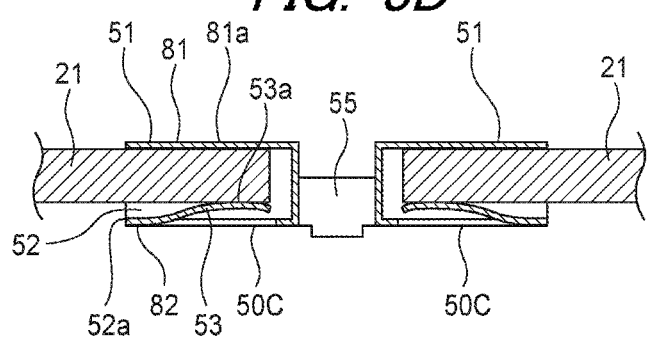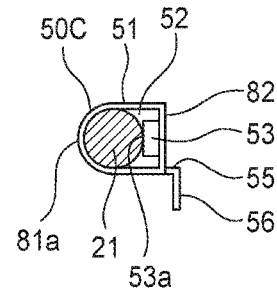

BRANCHING STRUCTURE AND WIRE HARNESS

CROSS-REFERENCE TO RELATED APPLICATION

The present application claims priority from Japanese Patent Application No. 2016-210509 filed on Oct. 27, 2016, the entire content of which is incorporated herein by reference.

FIELD OF INVENTION

The present invention relates to a branching structure configured to connect a main line harness and a branch line harness to each other, and a wire harness having the branching structure. The main line harness has a plurality of main lines each being configured as a wiring member having a rod conductor. The branch line harness has a plurality of branch lines.

RELATED ART

Wire harnesses connect power supplies and various electrical components mounted on vehicles. For example, a wire harnesses according to a related art (hereinafter "related-art harness") connects a main line harness having main lines such as a power supply wire and a ground wire are put together, to a branch line harness to be connected to an electrical component. In other words, the related-art harness has a configuration for branching the branch line harnesses from the main line harness. Specifically, the related-art harness is configured such that the main lines of the main line harness are caused to be in pressure contact with to pressure contact terminals provided inside a branching mechanism (a branching box) and such that the pressure contact terminals are connected to branch lines of each branch line harness (see, e.g., JP2015-227089A).

In the branching mechanism of the related-art harness, each pressure contact terminal has a pair of pressure contact blades. When one of the main lines is pushed in between the pair of pressure contact blades, the pressure contact blades cuts an insulating layer of the main line and reaches a conductor core wire so that the pressure contact terminal (pressure contact blades) and the main line (conductor core wire) can be electrically connected to each other. From such a connection principle, the pressure contact terminal has a structure (strength and the size etc.) capable of withstanding the pushing of the main line.

Due to the above structure of the pressure contact terminal, a distance between adjacent ones of the main lines of the main line harness (an interval between one main line and another main line adjacent to the one main line) is designed to be wide enough to dispose the pressure contact terminals. In other words, in the related-art harness, the branching mechanism makes it difficult to set the main lines closer to one another. As a result, the main line harness occupies a large space at each branching portion. A wire harness for a vehicle is characterized by being installed in a limited space inside a vehicle (e.g. under the floor etc.). Due to the characteristic of the wire harness, it is generally desirable that the space occupied by the main line harness be as small as possible.

From the viewpoint of weight reduction and improvement of handling of vehicle wire harnesses, main lines of a main line harness are sometimes configured as a wiring member having a rigid rod conductor (rod conductor), made of aluminum for example, and an insulating layer provided on the rod conductor. When the pressure contact terminals of the branching structure described above are used with such a wiring member, however, the pressure contact blades may not sufficiently bite into the rigid rod conductors so that electric connection between the main line (the rod conductor) and the pressure contact terminal may become incomplete. In other words, electric connection reliability at a branching portion may be lowered as compared with a case where a conventional main line (stranded wire) is used.

SUMMARY

Illustrative aspects of the present invention provide a branching structure and a wire harness having the branching structure, the branching structure being able to achieve both a reduction of a space occupied by a main line harness at a branching portion where a branch line harness branches from the main line harness and an improvement in reliability of electric connection at the branching portion.

According to an illustrative aspect of the invention, a branching structure is configured to connect a main line harness and a branch line harness to each other The main line harness has a plurality of main lines arranged side by side. Each of the main lines is configured as a wiring member having a rod conductor. The branch line harness has a plurality of branch lines. The branching structure includes connection terminals to be electrically connected to the main lines to form at least part of electrically conductive paths between the main lines and the branch lines. Each of the connection terminals has a tubular connection portion having a tubular shape to cover an outer circumferential surface of the rod conductor. The tubular connection portion has a pressing structure configured to elastically press the outer circumferential surface of the rod conductor placed inside a hollow portion of the tubular connection portion.

According to another illustrative aspect of the invention, a wire harness includes the main line harness having at least has a power supply line with a predetermined current capacity and configured to be arranged on a body of a vehicle, the branch line harness to be connected to electrical components mounted on the vehicle, and a control box arranged to distribute electric power of the power supply line fed to the main line harness to the branch line harness connected to the main line harness. The control box connects the main line harness and the branch line harness to each other by the branching structure described above.

Other aspects and advantages of the invention will be apparent from the following description, the drawings and the claims.

BRIEF DESCRIPTION OF THE DRAWINGS

FIGS. 8A to 8E illustrate an example of the connection terminals, FIG. 8A being a perspective view of main lines and the connection terminals, FIG. 8B being a sectional view taken along the line B-B in FIG. 8A, FIG. 8C being a side view seen from an insertion hole side of a tubular connection portion of the connection terminal before connecting the main lines, FIG. 8D being a sectional view taken along the line B-B in FIG. 8A with the main lines being connected, and FIG. 8E being a side view seen from the insertion hole side of the tubular connection portion with a cross section of the connected main line;

DETAILED DESCRIPTION

Hereinafter, exemplary embodiments of the present invention will be described with reference to the drawings.

Figure 1:
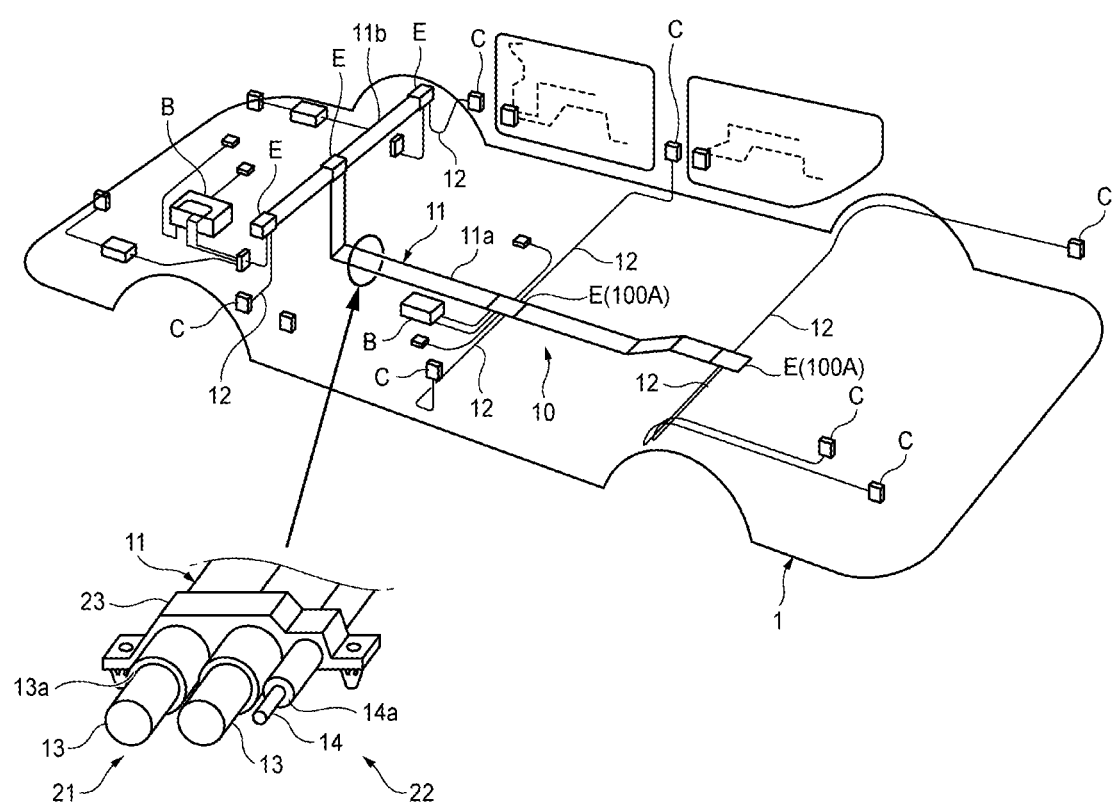
FIG. 1 is a schematic perspective view of a vehicle body along which a wire harness according to one or more exemplary embodiments of the present invention is arranged.

FIG. 1 illustrates a configuration of a wire harness 10 according to one or more exemplary embodiments of the present invention. As shown in FIG. 1, the wire harness 10 is provided as a path for feeding electric power from a power supply B such as an in-vehicle main battery and sub battery to electrical components serving as accessories at respective portions of a vehicle body 1 and also as a transmission path for sending and receiving signals to and from the electrical components.

The wire harness 10 includes a main line harness 11 and a plurality of branch line harnesses 12. The main line harness 11 includes, for example, main lines 21 (power supply line) and a signal line 22 (communication line) which are integrally retained by holding members 23 (e.g., clamps). The main lines 21 may include a power supply wire and ground wire, each having a rigid and round rod conductor and an insulator 13a covering around the rod conductor 13. The signal line 22 may include an optical fiber 14 (e.g., a plastic optical fiber) and a coating 14a. The main lines 21 and the signal line 22 may be held together by holding members 23 so as to be configured as a wiring member having a simple structure like a spine or a backbone. The holding members 23 may be provided by molding at predetermined intervals along a longitudinal direction of the main line 21.

The rod conductor 13 is a round rod made of an electrically conductive metal material such as aluminum or an aluminum alloy and has a circular cross section. The rod conductor 13 is a rigid body having higher rigidity than a stranded wire formed by twisting a plurality of element wires. The rod conductor 13 is lighter in weight than a copper wire etc. Further, the rod conductor 13 is a wiring member having a high degree of freedom for a wiring route which can be bent in any direction as necessary. The signal line 22 is not limited to an optical fiber. For example, a stranded wire or the like formed by stranding element wires made of copper, a copper alloy, or the like, may be used as the signal line 22.

The main line harness 11 includes a floor main line harness 11a and an instrument panel main line harness 11b. The floor main line harness 11a is disposed substantially at a central portion of the vehicle body 1 with respect to right-left direction and along a floor in a vehicle interior to extend in a front-rear direction of the vehicle body 1. The instrument panel main line harness 11b is disposed linearly in the lateral direction so as to be substantially parallel with a reinforcement in a region along a face of a not-shown dash panel. In a connection portion between the instrument panel main line harness 11b and the floor main line harness 11a, the instrument panel main line harness 11b and the floor main line harness 11a can be electrically connected to each other via a branching portion in a branching control box E. The branching control box E is a control box which will be described later. That is, the main line harness 11 is formed into a shape similar to a T-shape by the instrument panel main line harness 11b and the floor main line harness 11a.

The branch line harnesses 12 are connected to the main line harness 11 so as to branch from the main line harness 11 at predetermined branching portions. The branch line harnesses 12 have end portions to which connectors C are connected. Connectors of the electrical components provided at the respective portions of the vehicle body 1 are connected to the connectors C.

The control boxes E are provided on the main line harness 11 at various locations along the main line harness 11. Each of the control boxes E has a control portion by which electric power of the main line 21 and a signal of the signal line 22 fed to the main line harness 11 can be distributed to a corresponding one of the branch line harnesses 12 which is connected to the main line harness 11 so as to branch therefrom. In this manner, the electric power from the power supply B is fed to the electrical components of the respective portions, and the signals from the respective control boxes E are distributed likewise. As will be described later, one or more of the control boxes E (branching boxes 100A) have a branching structure according to one or more exemplary embodiments of the present invention.

In the wire harness 10, the branching boxes 100A are provided at connection portions between the main line harness 11 and the branch line harnesses 12. The main line harness 11 is connected with the branch line harnesses 12 by the branching boxes 100A.

Next, the branching structure in each of the branching boxes 100A will be described. To illustrate with a simplified example, a branching structure for connecting four branch lines 71 of a branch line harness 12 to four main lines 21 of a main line harness 11 arranged side by side will be described by way of example. For the same reason, description regarding a connection structure of the signal line 22 will be omitted.

Figure 2:
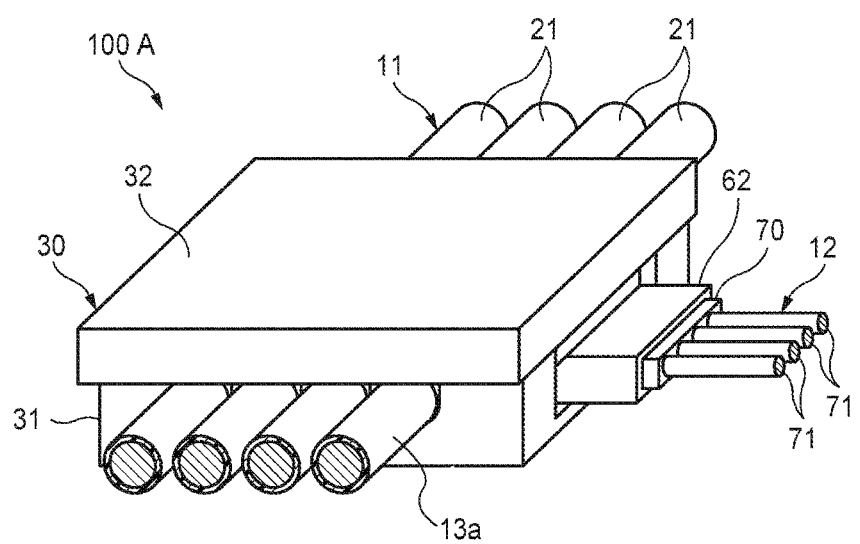
FIG. 2 is a perspective view of a branching box having a branching structure according to an exemplary embodiment of the present invention.
Figure 3:
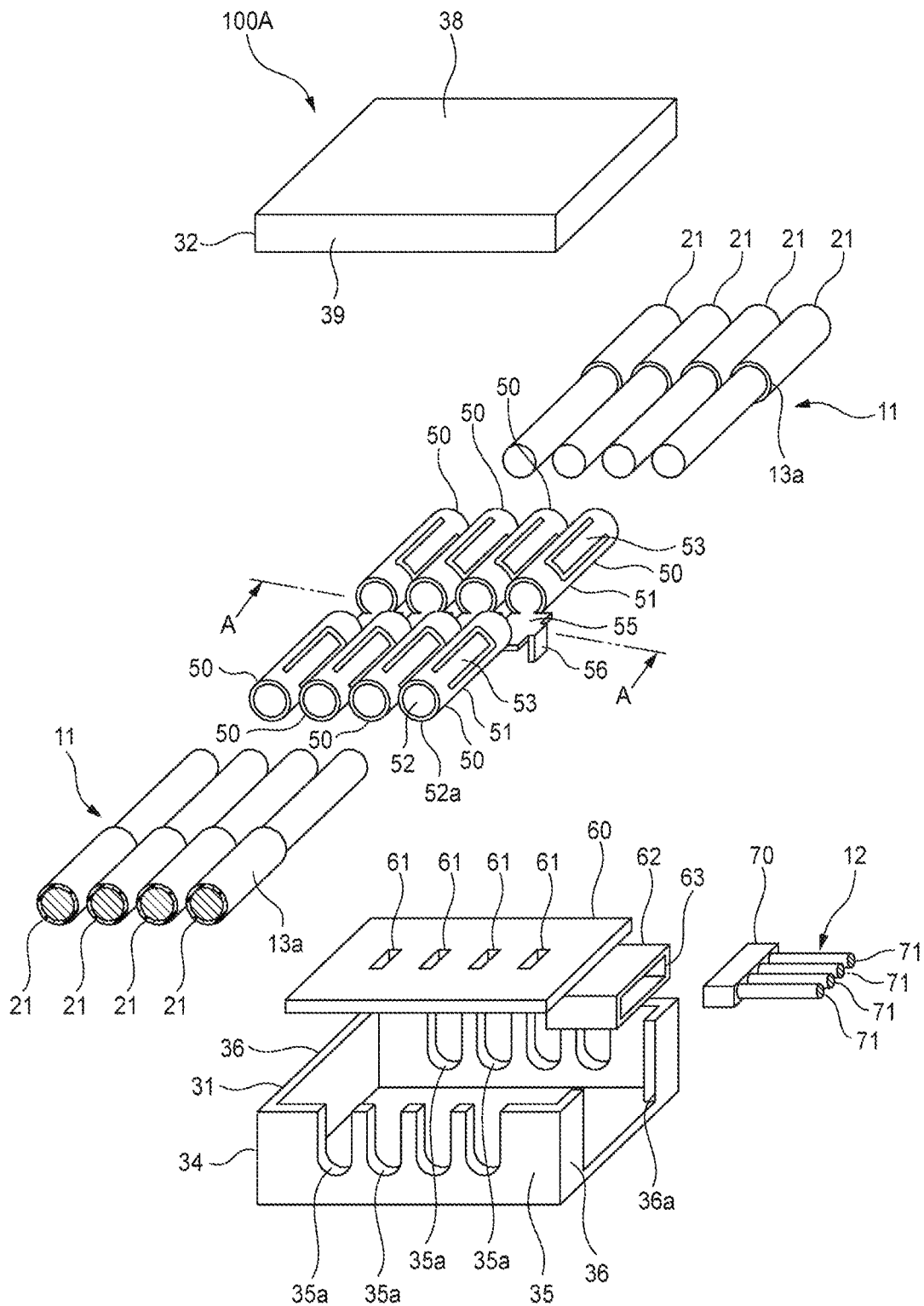
FIG. 3 is an exploded perspective view of the branching box of FIG. 2.

As shown in FIGS. 2 and 3, the branching box 100A has a receiving case 30. The receiving case 30 has a lower case 31 and a cover 32. Each of the lower case 31 and the cover 32 is formed out of an insulating resin.

The lower case 31 has a rectangular bottom plate portion 33, and a circumferential wall portion 34 which is formed on a circumferential edge of the bottom plate portion 33. The circumferential wall portion 34 has end surface plate portions 35 and side surface plate portions 36 which are disposed oppositely to each other respectively. A plurality of (four in this example) main line insertion recesses 35a are formed in each of the end surface plate portions 35 so that the main line insertion recesses 35a can be located in opposite positions respectively. Further, a connector receiving recess 36a is formed in one of the side surface plate portions 36.

The cover 32 has a rectangular upper surface plate portion 38, and a circumferential wall portion 39 which is formed on a circumferential edge of the upper surface plate portion 38. The cover 32 is mounted on the lower case 31 from above so as to be fixed thereto. Thus, the cover 32 is put on top of the lower case 31 so that the circumference of an upper portion of the circumferential wall portion 34 can be covered with the circumferential wall portion 39 of the cover 32.

A plurality of (four in this example) main lines 21 forming the main line harness 11 are inserted into the receiving case 30. As shown in FIG. 3, each main line 21 is divided, and the insulators 13a is removed at an end portion of each divided part of the main line 21. The end portions of the divided parts of the main line 21 from which the insulators 13a have been removed are inserted into the receiving case 30.

Figure 4:
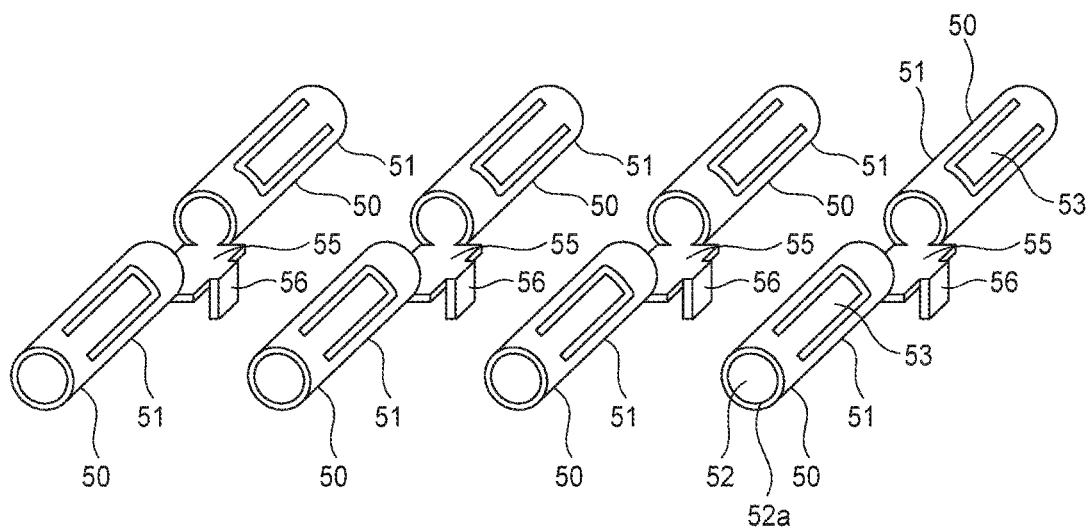
FIG. 4 is a perspective view of connection terminals provided in the branching box of FIG. 2.
Figure 5:
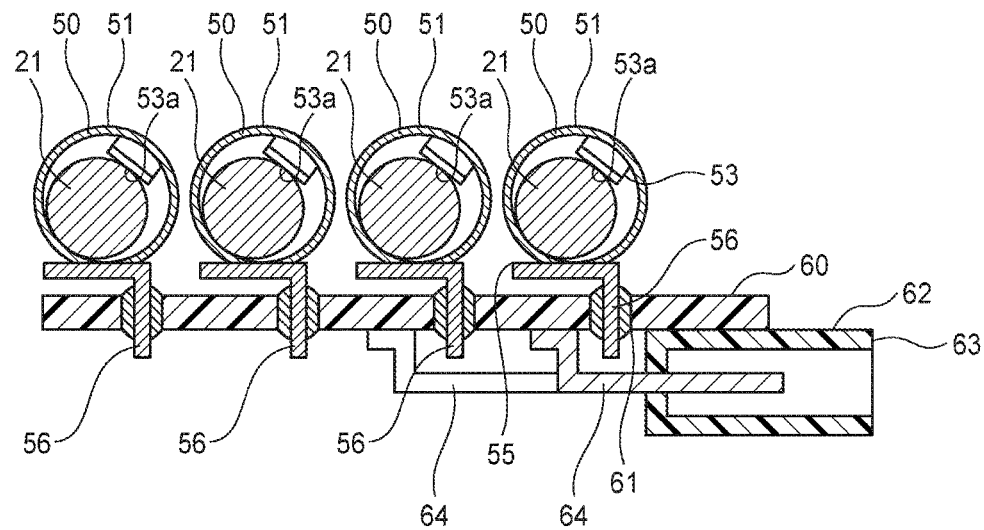
FIG. 5 is a sectional view taken along the line A-A in FIG. 3.

As shown in FIGS. 4 and 5, a plurality of connection terminals 50 are provided inside the receiving case 30. The connection terminals 50 have tubular connection portions 51 respectively. Each of the tubular connection portions 51 has a tubular shape covering an outer circumferential surface of each rod-shaped main line 21. The tubular connection portion 51 has a hollow portion 52 whose internal diameter is slightly larger than an outer diameter of the main line 21. The main line 21 is inserted into the hollow portion 52 from an insertion hole 52a which is one end side of the tubular connection portion 51.

Each of the tubular connection portions 51 has a press piece 53. The press piece 53 is formed as a portion of the tubular connection portion 51, and extends along an axial direction of the tubular connection portion 51. A base end of the press piece 53 is coupled to of a part of the tubular connection portion 51 on a side of the insertion hole 52a. A front end of the press piece 53 is a free end. A portion of the press piece 53 in the vicinity of the front end is configured as a pressing portion 53a protruding toward a center of the tubular connection portion 51. A distance between the pressing portion 53a of the press piece 53 protruding toward the center of the tubular connection portion 51 and a part of an inner circumference surface of the tubular connection portion 51 opposed to the pressing portion 53a is smaller than the outer diameter of the main line 21. The main line 21 which has been inserted in the tubular connection portion 51 is pressed elastically by the press piece 53. As a result, the main line 21 is brought into surface contact with the inner circumference surface of the tubular connection portion 51. Thus, the main line 21 and the tubular connection portion 51 are electrically conductively connected to each other. Thus, the tubular connection portion 51 has a pressing structure in which the press piece 53 elastically presses the outer circumferential surface of the main line 21.

With the branching box 100A having the configuration described above, when the end portions of the main lines 21 are inserted from the insertion holes 52a of the tubular connection portions 51 of the connection terminals 50, the main lines 21 are elastically pressed by the pressing portions 53a of the press pieces 53. As a result, the main lines 21 are pushed against the inner circumferential surfaces of the tubular connection portions 51 so as to be brought into contact therewith. Thus, the main lines 21 and the tubular connection portions 51 are electrically conductively connected to each other respectively.

Each pair of the connection terminals 50 into which the main lines 21 are inserted in an opposing manner are coupled to a coupling plate portion 55 at an end portion of each tubular connection portion 51 on a side opposite to the insertion hole 52a. Thus, the connection terminals 50 into which the main lines 21 are inserted in an opposing manner are electrically connected to each other via the coupling plate portion 55. A pin 56 protruding downward, i.e. outward in the radial direction of the tubular connection portions 51 is formed in the coupling plate portion 55.

Inside the receiving case 30, a circuit board 60 having a hard printed wiring board is provided along a direction in which the main lines 21 are arranged side by side. Insertion holes 61 (through holes) are formed in the circuit board 60 so that the pins 56 of the coupling plate portions 55 for coupling the connection terminals 50 can be inserted into the insertion holes 61. The insertion holes 61 are formed in the circuit board 60 at the same pitch as the arrangement of the main lines 21. The pins 56 of the coupling plate portions 55 for coupling the connection terminals 50 are inserted into the insertion holes 61 to be soldered and electrically connected to conductor patterns (not shown) formed in the circuit board 60.

Further, a connector 62 is provided on one side edge portion of the circuit board 60. The connector 62 has a housing 63. Connection pins 64 are provided inside the housing 63. The connection pins 64 of the connector 62 are electrically connected to the conductor patterns of the circuit board 60. The connector 62 is disposed in the connector receiving recess 36a formed in the lower case 31 of the receiving case 30 so that a portion of the housing 63 can be exposed to the outside from the receiving case 30.

A branching side connector 70 provided on the branch line harness 12 is connected to the connector 62. Terminals (not shown) connected to end portions of the branch lines 71 of the branch line harness 12 are disposed inside the branching side connector 70. When the branching side connector 70 is connected to the connector 62, the terminals provided in the branching side connector 70 are electrically connected to the connection pins 64 of the connector 62. Thus, the branch lines 71 of the branch line harness 12 are electrically connected to the main lines 21 of the main line harness 11 through the connection pins 64, the conductor patterns of the circuit board 60 and the connection terminals 50.

According to the branching structure using the branching box 100A described above, each tubular connection portion 51 having a tubular shape can reduce its size in the direction in which the main lines 21 are arranged side by side (i.e., lateral direction in FIG. 5) size of each of the main lines 21 as compared with the pressure contact terminals of the related art. Accordingly, a distance between adjacent ones of the main lines 21 can be made as narrow as possible so that the size of the main line harness 11 at the branching portion can be reduced.

Further, each of the connection terminals 50 is electrically connected to a corresponding main line 21 which is a rod conductor while elastically pressing the outer circumferential surface of the main line 21. Accordingly, reliability in electric connection between the main line 21 and the connection terminal 50 can be improved. Particularly, even in the case where the main line 21 which is the rod conductor is formed out of a material such as aluminum whose stress can be relaxed easily, the electric connection between the main line 21 and the connection terminal 50 can be kept stable for a long time as compared with that in a case where such elastic pressing is absent.

Further, the connection terminal 50 joined to the main line 21 can be electrically conductively connected to the corresponding branch line 71 through the corresponding conductor pattern of the circuit board 60. Accordingly, the connection terminal 50 can be commonalized and be made to have a simple configuration, leading to a reduction in manufacturing cost of the wire harness 10.

The wire harness 10 having the branching structure described above can be configured to have a simple structure, with the main line harness 11 having at least a power supply line (a main line 21) with a predetermined current capacity and arranged along the vehicle body 1, and the branch line harnesses 12 connecting the accessories as electrical components to the main line harness 11 through the control boxes E provided at various locations along the main line harness 11. Further, it is possible to achieve both a reduction of the space occupied by the main line harness 11 at each branching portion where each of the branch line harnesses 12 branches from the main line harness 11 and an improvement in reliability of electric connection at the branching portion.

Particularly, according to the branching structure according to the exemplary embodiment, the divided parts of each main line 21 are electrically connected to each other by the corresponding connection terminals 50. Accordingly, the divided parts of the main line 21 can be connected with a desired angle (see, e.g., FIG. 6) by changing the directions of the tubular connection portions 51 of the connection terminals 50 to adjust the connection directions of the parts of the main line 21. In this manner, the wiring route of the main line harness 11 can be bent as necessary. As a result, the degree of freedom for the wiring can be enhanced. In addition, it is possible to wire the main line harness 11 while absorbing a variation in length of the wiring route of the main line harness 11 in a region where the main lines 21 are inserted into the tubular connection portions 51. Thus, wiring work can be improved.

For example, the wiring route of the main line harness 11 in the wire harness 10 may have to be bent in accordance with the shape of the vehicle body 1. In such as case, the wiring route of the main line harness 11 can be bent easily by using the branching box 100A described above.

Figure 6:
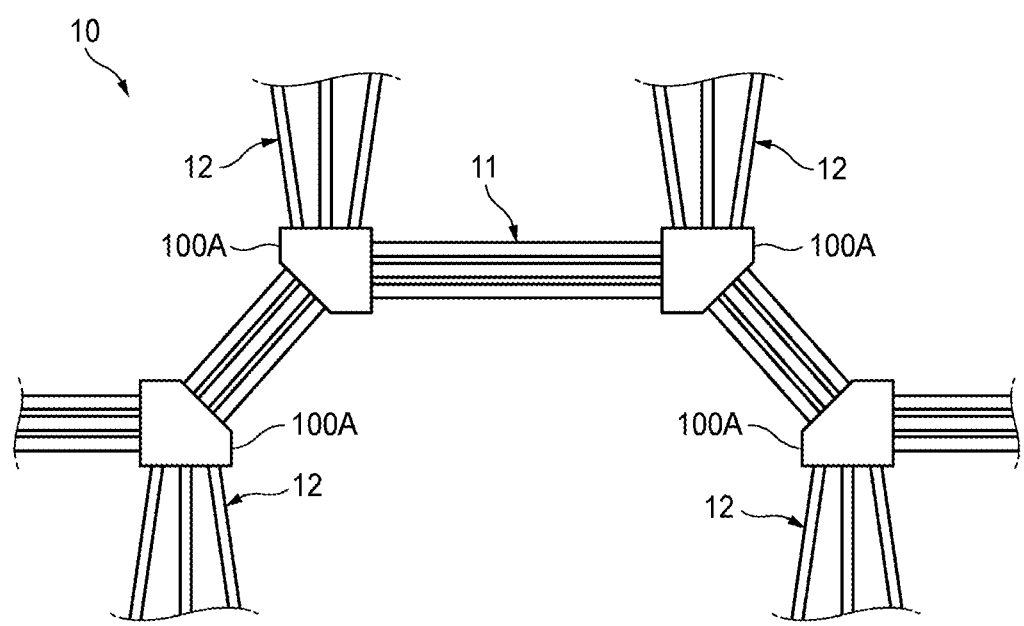
FIG. 6 is a plan view of a wire harness having bent portions in a wiring route.

Here, the wire harness 10 in which the wiring route of the main line harness 11 is bent will be described in more detail with reference to FIG. 6. As shown in FIG. 6, in the wire harness 10, the wiring route of the main line harness 11 is bent at locations where the branch line harnesses 12 branch from the main line harness 11. In such a wire harness 10, branching boxes 100A capable of changing a wiring direction of the main line harness 11 are provided at locations where the main line harness 11 and the branch line harnesses 12 are connected to each other. In this manner, the main line harness 11 is electrically connected with the branch line harnesses 12 by the branching boxes 100A respectively in the wire harness 10. As a result, the branch line harnesses 12 can be made to branch from the main line harness 11 and the wiring route of the main line harness 11 can be further bent.

Next, another exemplary embodiment of the present invention will be described. In the following description, the same features as the exemplary embodiment described above will be denoted by the same reference signs, and description thereof will be omitted.

Figure 7:
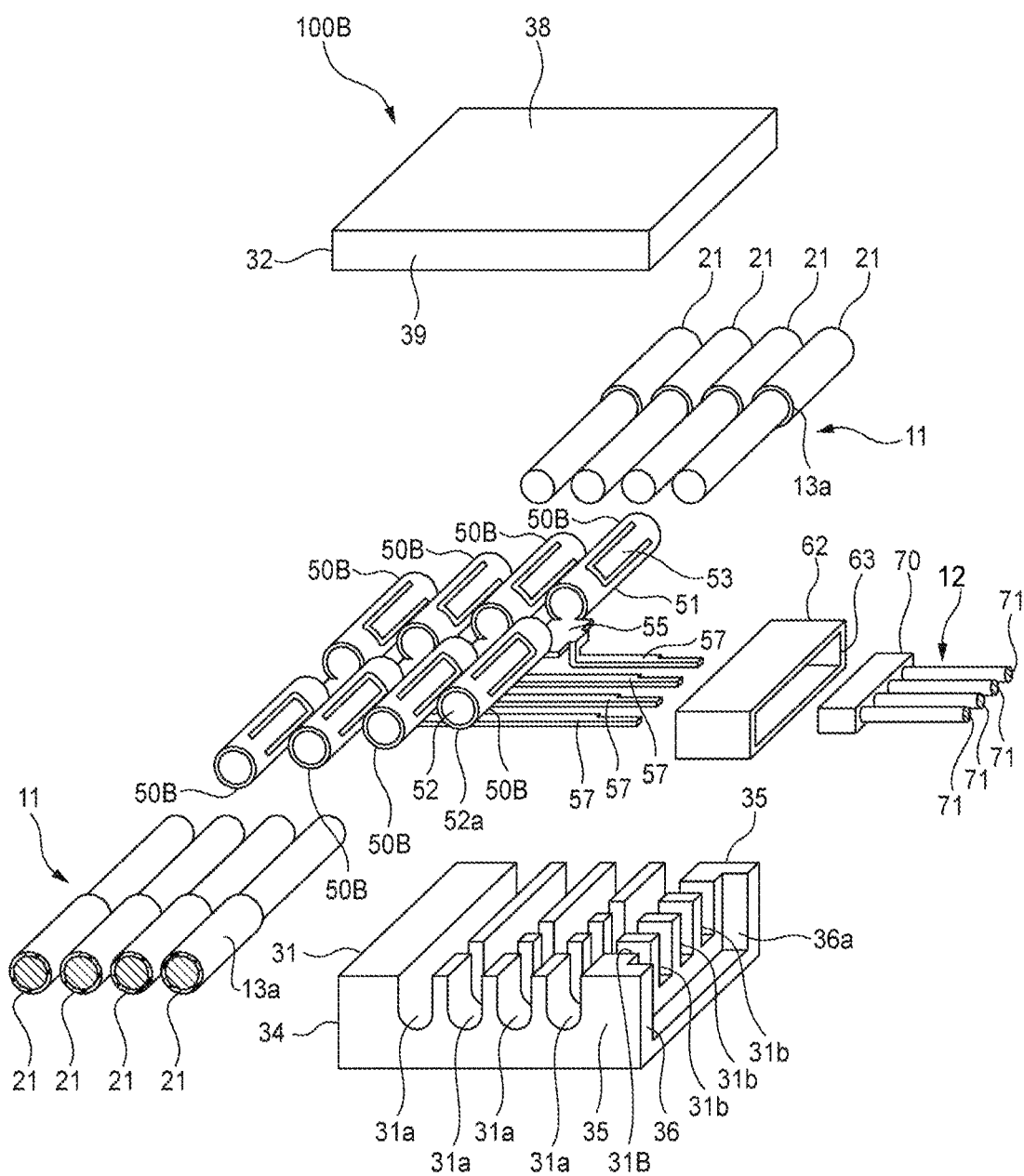
FIG. 7 is a perspective view of a branching box having a branching structure according to another exemplary embodiment of the present invention.

As shown in FIG. 7, in a branching structure according to this exemplary embodiment, a main line harness 11 and a branch line harness 12 are connected to each other using a branching box 100B.

The branching box 100B is not have a circuit board 60 like the branching box 100A but has connection terminals 50B having bus bars 57. Each of the bus bars 57 extends downward from a lower end of a corresponding coupling plate portion 55 and further extends in a direction in which the main lines 21 are arranged side by side, i.e., the direction perpendicular to a longitudinal direction of the main line harness 11. The connection terminals 50B having different lengths of the bus bars 57 in accordance with distances between the connection terminals 50B and the branch line 12 connected to a connector 62 are connected to the main lines 21 respectively. End portions of the bus bars 57 of the connection terminals 50B are provided as connection pins inside a housing 63 of the connector 62.

Main line receiving grooves 31a and bus bar receiving grooves 31b are formed in a lower case 31 of the branching box 100B. Tubular connection portions 51 of the connection terminals 50B into which the main lines 21 of the main line harness 11 are inserted are received and retained in the main line receiving grooves 31a respectively. The bus bars 57 extending from the coupling plate portions 55 of the connection terminals 50B are received and retained in the bus bar receiving grooves 30b respectively.

In this exemplary embodiment, a branching side connector 70 of the branch line harness 12 is connected to the connector 62 of the branching box 100B. Thus, branch lines 71 of the branch line harness 12 are electrically connected to the main lines 21 of the main line harness 11 through the connection terminals 50B.

Also in this exemplary embodiment, the tubular connection portions 51 each having a tubular shape are provided. Thus, an interval between adjacent ones of the main lines 21 can be made as narrow as possible so that the size of the main line harness 11 at a branching portion can be reduced.

Further, the connection terminals 50B are electrically connected to the main lines 21 which are rod conductors while elastically pressing outer circumferential surfaces of the main lines 21. Therefore, reliability in electric connection between the main lines 21 and the connection terminals 50B can be improved. Particularly, even in the case where the main lines 21 which are the rod conductors are formed out of a material such as aluminum whose stress can be relaxed easily, the electric connection between the main lines 21 and the connection terminals 50B can be kept stable for a long time as compared with that in a case where such elastic pressing is absent.

The bus bars 57 extending from the tubular connection portions 51 are provided in the connection terminals 50B. Thus, the connection terminals 50B joined to the main lines 21 can be electrically conductively connected to the branch lines 71 without using the circuit board 60. Thus, the number of components forming the branching structure can be reduced so that manufacturing cost of a wire harness 10 can be reduced.

The wire harness 10 having the branching structure described above can be configured to have a simple structure, with the main line harness 11 having at least a power supply line with a predetermined current capacity and arranged along a vehicle body 1, and the branch line harnesses 12 connecting accessories to the main line harness 11 through control boxes provided at various locations along the main line harness 11. In addition, the size of the main line harness at each location where each of the branch line harnesses 12 branches from the main line harness 11 can be reduced.

Also in this exemplary embodiment, the divided parts of the main line 21 can be connected to each other with an angle by changing the directions of each pair of the tubular connection portions 51 of the connection terminals 50B to adjust connection directions of the main lines 21. Thus, a wiring route of the main line harness 11 can be bent as necessary. As a result, the degree of freedom for the wiring can be enhanced (see FIG. 6). Further, it is possible to wire the main line harness 11 while absorbing a variation in length of the wiring route of the main line harness 11 at a location where the main lines 21 are inserted into the tubular connection portions 51. Thus, wiring work can be improved.

The branching boxes 100A, 100B described above may have various structures for the connection terminals. Some examples of the connection terminals will be described below. The same features as the exemplary embodiments described above will be denoted by the same reference signs, and description thereof will be omitted.

FIGS. 8A to 8D illustrates one example of the connection terminals.

As shown FIGS. 8A to 8C, each connection terminal 50C has a tubular connection portion 51 having a tubular shape. The tubular connection portion 51 has a contact plate portion 81 formed into a U-shape in section, and a press plate portion 82 shaped like a flat plate. The contact plate portion 81 has an arc portion 81a formed into an arc shape. The arc portion 81a is formed into the arc having an internal diameter the same as an outer diameter of each main line 21. A press piece 53 is formed in the press plate portion 82 of the tubular connection portion 51. The arc portion 81a is provided in an opposed position to the press piece 53.

As shown in FIG. 8D and FIG. 8E, when an end portion of the main line 21 is inserted from an insertion hole 52a of the tubular connection portion 51, the main line 21 is elastically pressed by a pressing portion 53a of the press piece 53 of the press plate portion 82. As a result, the main line 21 is pushed against the contact plate portion 81. Thus, an outer circumferential surface of the main line 21 is brought into surface contact with the arc portion 81a of the contact plate portion 81 formed into the arc shape having the same internal diameter as the outer diameter of the main line 21.

Thus, according to the connection terminal 50C, the outer circumferential surface of the main line 21 is brought into surface contact with the arc portion 81a of the contact plate portion 81 formed into the arc shape having the same internal diameter as the outer diameter of the main line 21. Accordingly, the main line 21 and the tubular connection portion 51 can be reliably brought into surface contact with each other, thereby securing a large contact area therebetween.

Figure 9A:
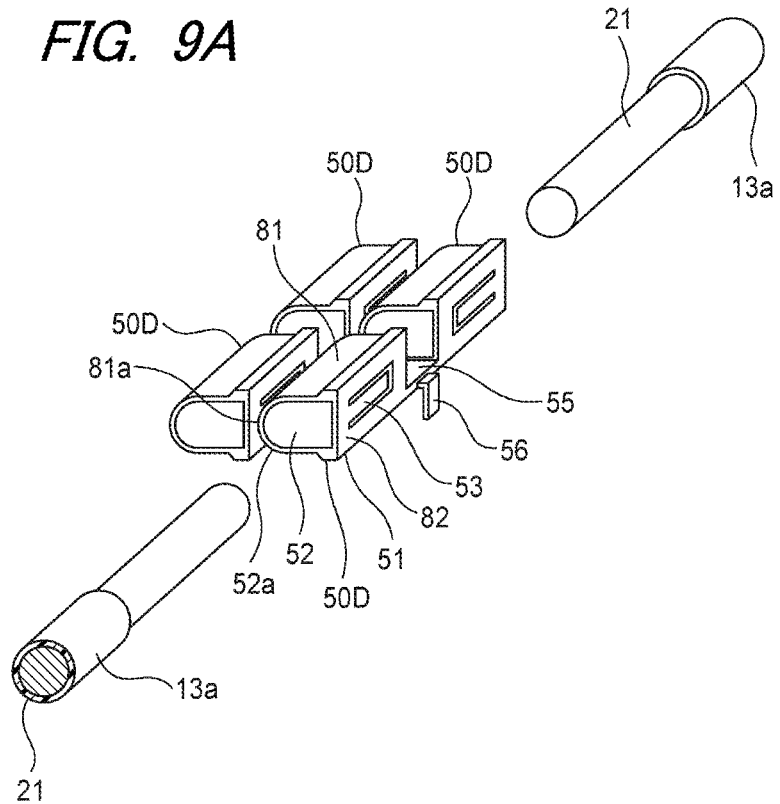
FIGS. 9A to 9C illustrate another example of the connection terminals, FIG. 9A being a perspective view of main lines and the connection terminals, FIG. 9B being a side view seen from an insertion hole side of a tubular connection portion of the connection terminal with a cross section of a large-diameter main line being connected, and FIG. 9C being a side view seen from the insertion hole side of the tubular connection portion with a cross section of a small-diameter main line being connected.
Figure 9B:
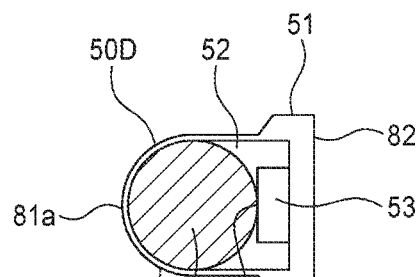
Figure 9C:
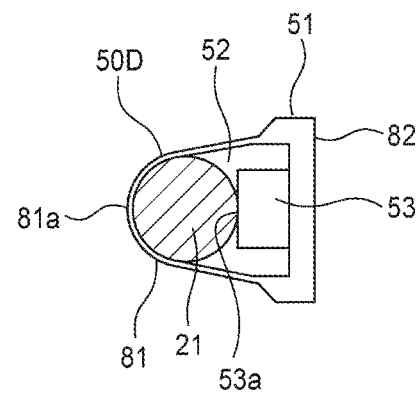

FIGS. 9A to 9C illustrates another example of the connection terminals.

As show in FIG. 9A and FIG. 9B, each connection terminal 50D also has a tubular connection portion 51 having a tubular shape. The tubular connection portion 51 has a contact plate portion 81 formed into a U-shape in section, and a press plate portion 82 shaped like a flat plate. The contact plate portion 81 has an arc portion 81a formed into an arc shape.

In the connection terminal 50D, the press plate portion 82 is thickened in plate thickness to be thereby enhanced in rigidity. Thus, elastic force of a press piece 53 is also enhanced. On the other hand, the contact plate portion 81 is thinned in plate thickness to be able to be deformed easily.

As shown in FIG. 9B, when an end portion of a main line 21, for example, whose outer diameter is the same as an internal diameter of the arc portion 81a is inserted into a hollow portion 52 from an insertion hole 52a of the tubular connection portion 51 in the connection terminal 50D, the main line 21 is elastically pressed by a pressing portion 53a of the press piece 53 of the press plate portion 82. As a result, the main line 21 is pushed against the contact plate portion 81. Thus, an outer circumferential surface of the main line 21 is brought into surface contact with the arc portion 81a of the contact plate portion 81.

On the other hand, as shown in FIG. 9C, when a main line 21 having an outer diameter smaller than the internal diameter of the arc portion 81a is inserted into the hollow portion 52 from the insertion hole 52a of the tubular connection portion 51, the main line 21 is elastically pressed by the pressing portion 53a of the press piece 53 of the press plate portion 82. As a result, the main line 21 is pushed against the contact plate portion 81. Thus, due to the main line 21 which presses the contact plate portion 81 thinned in plate thickness, the contact plate portion 81 is deformed following an external shape of the main line 21. Thus, the contact plate portion 81 is brought into surface contact with an outer circumferential surface of the main line 21.

Thus, according to the connection terminal 50D, due to the main line 21 which presses the contact plate portion 81 thinned in plate thickness, the contact plate portion 81 is deformed following the external shape of the main line 21. Accordingly, when the connection terminal 50D is connected with any of the main lines 21 different in outer diameter, the contact plate portion 81 can be surely brought into surface contact with the outer circumferential surface of the main line 21. As a result, the main line 21 and the tubular connection portion 51 can be reliably brought into surface contact with each other, thereby ensuring a large contact area therebetween.

Figure 10A:
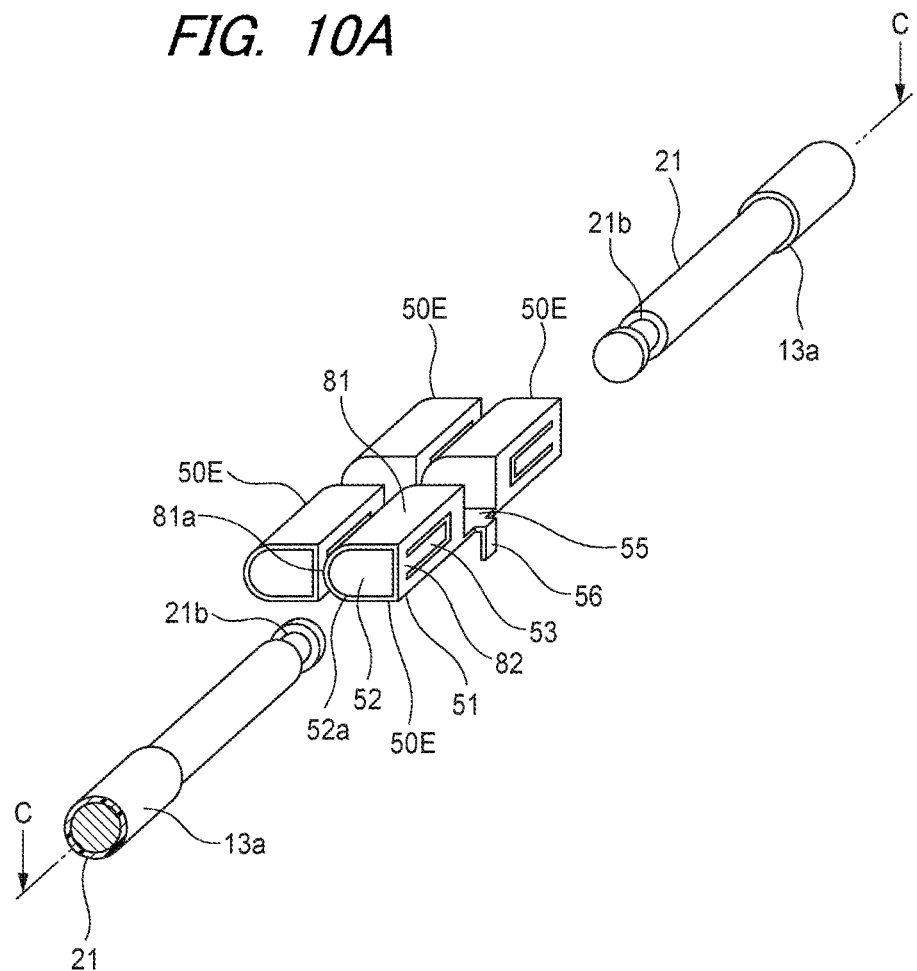
FIGS. 10A and 10B illustrate another example of the connection terminals, FIG. 10A being a perspective view of main lines and the connection terminals, and FIG. 10B being a sectional view taken along the line C-C in FIG. 10A.
Figure 10B:
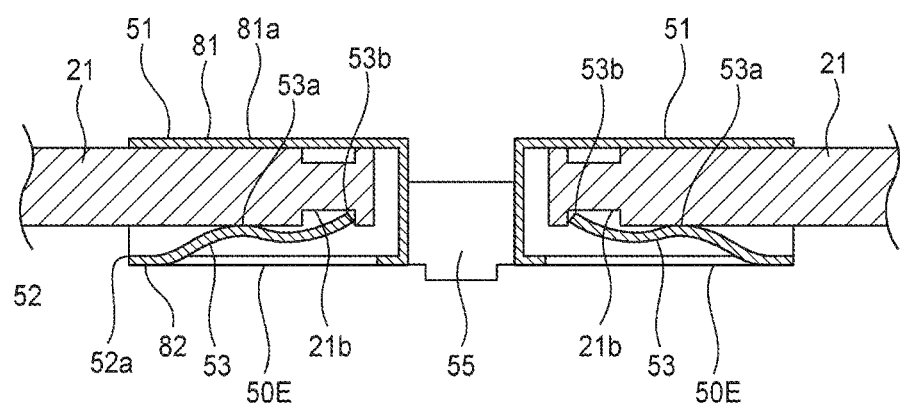

FIGS. 10A and 10B illustrates another example of the connection terminals.

As shown in FIGS. 10A and 10B, each connection terminal 50E also has a tubular connection portion 51 having a tubular shape. The tubular connection portion 51 has a contact plate portion 81 formed into a U-shape in section, and a press plate portion 82 shaped like a flat plate. The contact plate portion 81 has an arc portion 81a formed into an arc shape.

In the connection terminal 50E, a front end of a press piece 53 is used as a lock end 53b. The lock end 53b protrudes more toward a center side of the tubular connection portion 51 than a pressing portion 53a of the press piece 53.

Further, a lock groove 21b is formed circumferentially in the vicinity of an end portion of a main line 21 inserted into the connection terminal 50E.

When the end portion of the main line 21 is inserted into a hollow portion 52 from an insertion hole 52a of the tubular connection portion 51 in the connection terminal 50E, the main line 21 is elastically pressed by the pressing portion 53a of the press piece 53. As a result, the main line 21 is pushed against the contact plate portion 81. Thus, an outer circumferential surface of the main line 21 is brought into surface contact with the arc portion 81a of the contact plate portion 81 formed into the arc shape with an internal diameter the same as an outer diameter of the main line 21.

Further, when the end portion of the main line 21 is inserted into the hollow portion 52 of the tubular connection portion 51 in the connection terminal 50E, the lock end 53b of the front end of the press piece 53 enters the lock groove 21b formed in the vicinity of the end portion of the main line 21. Thus, the vicinity of the end portion of the main line 21 is locked by the lock end 53b of the press piece 53 so that the main line 21 can be prevented from dropping off from the tubular connection portion 51.

Thus, according to the connection terminal 50E, the lock end 53b of the press piece 53 locks the vicinity of the end portion of the main line 21. In this manner, the main line 21 can be prevented from dropping off from the tubular connection portion 51. Thus, an excellent connection state between the main line 21 and the tubular connection portion 51 can be maintained surely.

Figure 11A:
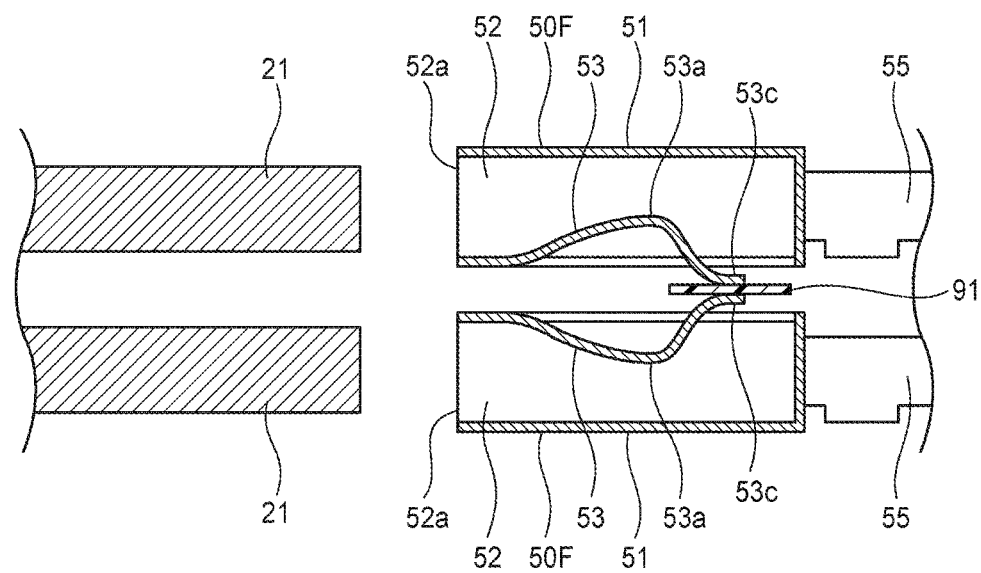
FIGS. 11A and 11B illustrate another example of the connection terminals, FIG. 11A being a horizontal sectional view of mail lines and the connection terminals before connecting the main lines, and FIG. 11B being a horizontal sectional view of the main lines and the connection terminals connecting the main lines.
Figure 11B:
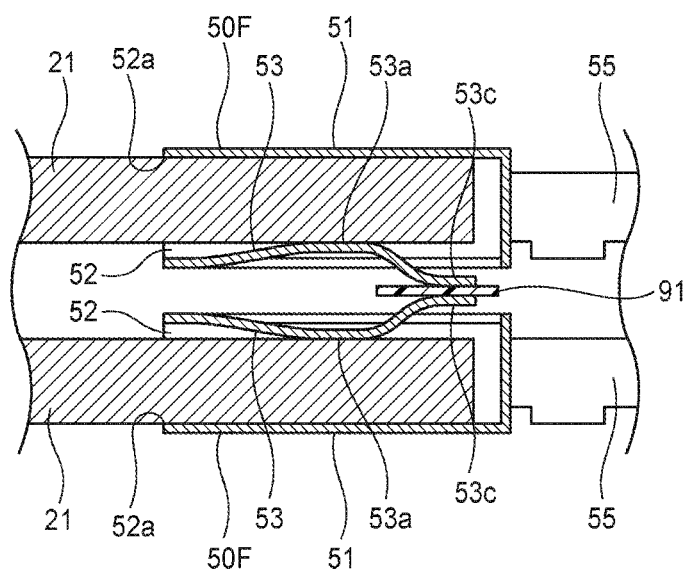

FIGS. 11A and 11B illustrates another example of the connection terminals.

As shown in FIG. 11A, each connection terminal 50F includes a press piece 53 having a front end configured as an abutment end 53c. The abutment ends 53c are protruded laterally from tubular connection portions 51. The press pieces 53 are formed in opposed positions of a pair of the connection terminals 50F adjacent to each other.

In the pair of the connection terminals 50F adjacent to each other, the abutment ends 53c of the press pieces 53 of the tubular connection portions 51 are protruded in directions approaching each other. A plate-like insulating member 91 formed out of an insulating material is disposed between the abutment ends 53c so that the abutment ends 53c can be insulated from each other. In the pair of the connection terminals 50F adjacent to each other, the abutment ends 53c of the press pieces 53 are butted against each other through the insulating member 91.

As shown in FIG. 11B, when end portions of main lines 21 are inserted into hollow portions 52 from insertion holes 52a of the tubular connection portions 51 in the connection terminals 50F, the main lines 21 are elastically pressed by pressing portions 53a of the press pieces 53. As a result, the main lines 21 are pushed against inner circumferential surfaces of the tubular connection portions 51. In this manner, outer circumferential surfaces of the main lines 21 are brought into surface contact with the inner circumferential surfaces of the tubular connection portions 51. On this occasion, in the pair of the connection terminals 50F adjacent to each other, the abutment ends 53c of the front ends of the press pieces 53 are butted against each other through the insulating member 91. Thus, the press pieces 53 can be restricted from being displaced to the outsides of the tubular connection portions 51. Accordingly, due to reaction forces from the press pieces 53 of the adjacent tubular connection portions 51, elastic forces of the press pieces 53 applied to the main lines 21 are enhanced. As a result, the main lines 21 are brought into contact with the inner circumferential surfaces of the tubular connection portions 51 with higher contact loads.

Thus, according to the connection terminals 50F, due to the reaction forces from the press pieces 53 of the adjacent tubular connection portions 51, the elastic forces of the press pieces 53 applied to the main lines 21 can be enhanced. Thus, the main lines 21 can be brought into contact with the inner circumferential surfaces of the tubular connection portions 51 with the higher contact loads. Consequently, the main lines 21 and the tubular connection portions 51 can be reliably brought into contact with each other.

Figure 12A:
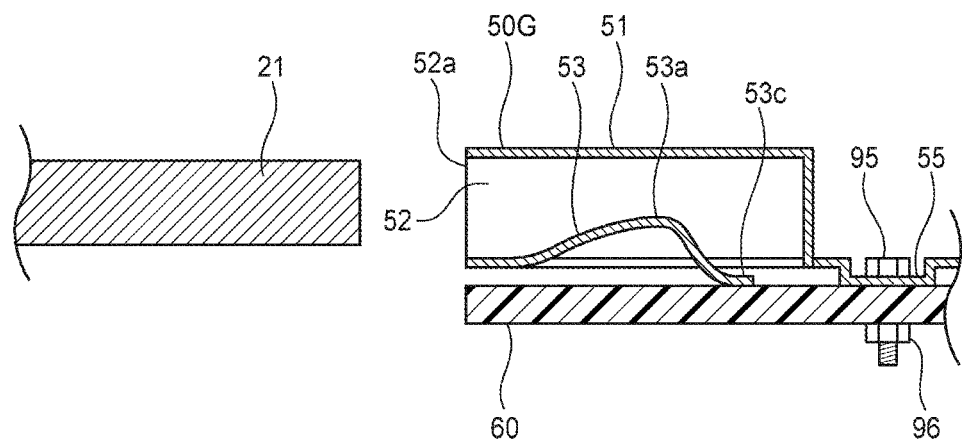
FIGS. 12A and 12B illustrate another example of the connection terminals, FIG. 12A being a vertical sectional view of a main line and a connection terminal before connecting the main line, and FIG. 12B being a vertical sectional view of the main line and the connection terminal connecting the main line.
Figure 12B:
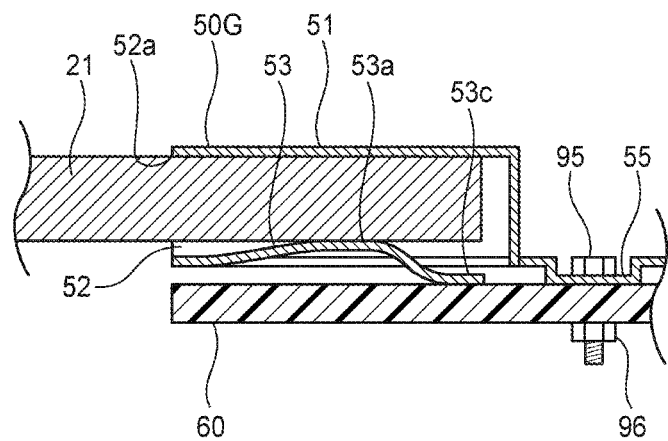

FIGS. 12A and 12B illustrates another example of the connection terminals.

As shown in FIG. 12A, a connection terminal 50G also includes a press piece 53 having a front end configured as as an abutment end 53c. The press piece 53 is formed on a circuit board 60 side of a tubular connection portion 51. The abutment piece 53c of the press piece 53 of the tubular connection portion 51 is protruded toward the circuit board 60 side to be butted against a surface of the circuit board 60. In addition, a coupling plate portion 55 for coupling adjacent ones of the connection terminals 50G to each other is fixed to the circuit board 60 by a screw 95 and a nut 96.

As shown in FIG. 12B, when an end portion of a main line 21 is inserted into a hollow portion 52 from an insertion hole 52a of the tubular connection portion 51 in the connection terminal 50G, the main line 21 is elastically pressed by a pressing portion 53a of the press piece 53. Thus, the main line 21 is pushed against an inner circumferential surface of the tubular connection portion 51. In this manner, an outer circumference surface of the main line 21 is brought into surface contact with the inner circumferential surface of the tubular connection portion 51. On this occasion, the abutment end 53c of the front end of the press piece 53 of the tubular connection portion 51 is butted against the circuit board 60. Thus, the press piece 53 can be restricted from being displaced to the outside of the tubular connection portion 51. Accordingly, due to reaction force from the circuit board 60, elastic force of the press piece 53 applied to the main line 21 is enhanced. As a result, the main line 21 is brought into contact with the inner circumferential surface of the tubular connection portion 51 with a higher contact load.

Thus, according to the connection terminal 50G, due to the reaction force from the circuit board 60, the elastic force of the press piece 53 applied to the main line 21 can be enhanced. Thus, the main line 21 can be brought into contact with the inner circumferential surface of the tubular connection portion 51 with the higher contact load. As a result, the main line 21 and the tubular connection portion 51 can be reliably brought into contact with each other.

Figure 13A:
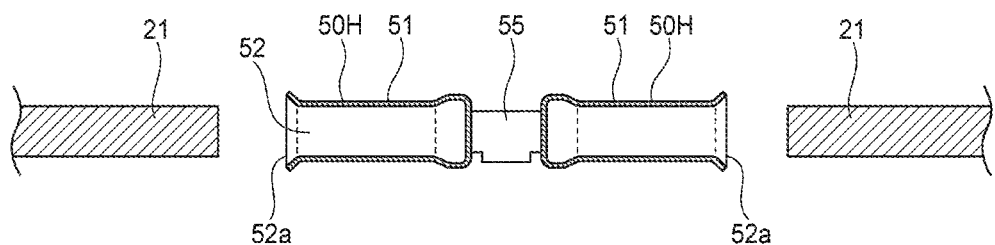
FIGS. 13A and 13B illustrate another example of the connection terminals, FIG. 13A being a horizontal sectional view of main lines and the connection terminals before connecting the main lines, and FIG. 13B being a horizontal sectional view of the main lines the connection terminals connecting the main lines.
Figure 13B:
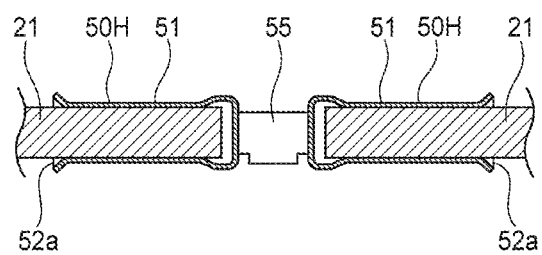

FIGS. 13A and 13B illustrates another example of the connection terminals.

As shown in FIG. 13A and FIG. 13B, each connection terminal 50H has a tubular connection portion 51 having no press piece 53. The tubular connection portion 51 has a circular tubular shape. The tubular connection portion 51 except its opposite end portions is formed to have an internal diameter slightly smaller than an outer diameter of each main line 21. In addition, an insertion hole 52a of the tubular connection portion 51 is formed into a tapered shape gradually narrower in an insertion direction of the main line 21.

An end portion of the main line 21 is pressed into a hollow portion 52 of the tubular connection portion 51 in the connection terminal 50H. The tubular connection portion 51 is formed to have the slightly smaller diameter than the outer diameter of the main line 21. Thus, an inner circumferential surface of the tubular connection portion 51 is closely fitted to an outer circumferential surface of the main line 21 so as to be brought into surface contact therewith.

Further, when the end portion of the main line 21 is pressed from an insertion hole 52a of the tubular connection portion 51 in the connection terminal 50H, the main line 21 is guided into the hollow portion 52 by the insertion hole 52a having the tapered shape. Thus, the main line 21 can be pressed into the tubular connection portion 51 smoothly.

Thus, according to the connection terminal 50H, the inner circumferential surface of the tubular connection portion 51 is closely fitted to and brought into surface contact with the outer circumferential surface of the main line 21 which has been pressed into the hollow portion 52 of the tubular connection portion 51. Accordingly, an excellent electrically conductive connection state between the main line 21 and the tubular connection portion 51 can be secured. Moreover, a variation in the outer diameter of the main line 21 can be absorbed. In addition, due to the simple shape of the tubular connection portion 51 from which the press piece 53 is absent, manufacturing cost can be reduced.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

For example, in the exemplary embodiments and examples described above, the rod conductor 13 having a shape of a round rod is used as the wiring member of each main line 21 of the main line harness 11. However, the rod conductor 13 is not limited to this, and may be a rigid rod having a polygonal cross section such as a square rod. The rod conductor 13 shaped like a round rod is easily brought into surface contact with the sectionally circular tubular connection portion 51 uniformly even when the rod conductor 13 is rotated around the axis. Further, the rod conductor 13 can be bent easily in any direction such as an up, down, left or right direction. Therefore, it is preferable that the rod conductor 13 shaped like a round rod is used. When a rod conductor having a polygonal cross section is used as the main line 21, it is preferable that the tubular connection portion 51 of the connection terminal 50 have a cross sectional shape capable of making surface contact with the outer circumferential surface of the main line 21.

Further, a plurality of press pieces 53 may be provided in the tubular connection portion 51 having a circular tubular shape. In this case, it is preferable that the press pieces 53 are disposed at regular intervals along a circumferential direction.

Further, the insulator 13a provided in advance may be removed from the main line 21 to expose a connection part when connecting the main line 21 to the connection terminal 50 (tubular connection portion 51). Alternatively, the insulator 13a may be provided on a part of the main line 21 other than the connection part in a subsequent step after connecting the main line 21 to the connection terminal 50 (tubular connection portion 51).

Some aspects of one or more of the exemplary embodiments described above will be summarized below.

A branching structure is configured to connect a main line harness (11) and a branch line harness (12) to each other. The main line harness (11) has a plurality of main lines (21) arranged side by side. Each of the main lines (21) is configured as a wiring member having a rod conductor (13). The branch line harness (12) has a plurality of branch lines (71). The branching structure includes connection terminals (50) to be electrically connected to the main lines (21) to form at least part of electrically conductive paths between the main lines (21) and the branch lines (71). Each of the connection terminals (50) has a tubular connection portion (51) having a tubular shape to cover an outer circumferential surface of the rod conductor (13). The tubular connection portion (51) has a pressing structure configured to elastically press the outer circumferential surface of the rod conductor (13) placed inside a hollow portion (52) of the tubular connection portion (51).

With this branching structure, the tubular connection portions electrically connected to the main lines do not bite into the main lines (conductors) like the pressure contact terminals of the related-art harness but are configured to cover and press the outer circumferential surfaces of the rod conductors (e.g., by having pressing portions as contact points). Accordingly, the tubular connection portions do not have to have strength and size to withstand biting into the conductors like the pressure contact terminals of the related-art harness, so that the tubular connection portions can be downsized as compared with the related-art pressure contact terminals. As a result, the size of the main line harness can be reduced at the branching portion.

Further, each connection terminal (tubular connection portion) is electrically connected to the rod conductor by elastically pressing the outer circumferential surface of the rod conductor. Accordingly, even when displacement or deformation occurs with the rod conductor, electric connection between the rod conductor and the connection terminal can be maintained. Particularly, even in the case where a material such as aluminum whose stress can be relaxed easily is used to form the rod conductor, the pressing structure of the connection terminal (tubular connection portion) can follow the deformation caused by the stress relaxation of the rod conductor. Accordingly, reliability in the electric connection can be improved as compared with the pressure contact terminals of the related-art harness which cannot follow such a deformation or can only follow such a deformation by a small limited amount.

Accordingly, with the branching structure having the configuration described above, it is possible to achieve both reduction of space occupied by the main line harness at a branching portion where the branch line harness branches from the main line harness and an improvement in electric connection at the branching portion.

The branching structure may further include a circuit board (60) on which the connection terminals (50) are mounted, a connector (62) provided on the circuit board (60), and a counterpart connector (70) to be electrically connected to the branch lines (71). The connection terminals (50), the circuit board (60), the connector (62) and the counterpart connector (70) form the electrically conductive paths.

With this branching structure, the connection terminals (tubular connection portions) electrically connected to the main lines are electrically conductively connected to the branch lines (counterpart connector) through the conductor patterns and the connector of the circuit board. Accordingly, by providing various switches and control circuits on the circuit board, a difference in electrical components (e.g., a difference in the number and specifications of the branch lines in the branch line harness) to which the branch line harness is connected can be absorbed by the circuit board. As a result, the connection terminals can be commonalized and be made to have a simple configuration, whereby manufacturing cost of the wire harness can be suppressed.

The connection terminals (50B) may have bus bars (57) extending from the tubular connection portions (51), and the branching structure may further include a connector (62) provided at end portions of the bus bars (57), and a counterpart connector (70) to be electrically connected to the branch lines (71). The connection terminals (50B), the connector (62) and the counterpart connector (70) form the electrically conductive paths.

With this branching structure, the connection terminals (the bus bars extending from the tubular connection portions) are directly electrically conductively connected to the branch lines (counterpart connector) not through any circuit board as in the other configuration described above. As a result, the number of components forming the branching structure can be reduced. Hence, the manufacturing cost of the wire harness can be suppressed.

Regarding the alternative configurations described above, a more preferable branching structure may be selected suitably in consideration of the structure of the wire harness, the number and kinds of electrical components as branching destinations, and the manufacturing cost which can be allowed. The wire harness may have only one of the branching structures or both of the branching structures.

A wire harness includes the main line harness (11) having at least has a power supply line with a predetermined current capacity and configured to be arranged on a body (1) of a vehicle, the branch line harness (12) to be connected to electrical components mounted on the vehicle, and a control box (E) arranged to distribute electric power of the power supply line fed to the main line harness (11) to the branch line harness (12) connected to the main line harness (11). The control box (E) connects the main line harness (11) and the branch line harness (12) to each other by the branching structure described above.

This wire harness can be configured to have a simple structure, with the main line harness having at least he power supply line with the predetermined current capacity and arranged along the vehicle body, and the branch line harnesses to connect accessories which are the electrical components to the main line harness through the control boxes provided at various locations along the main line harness. Further, it is possible to achieve both a reduction of the space occupied by the main line harness at each branching portion where each of the branch line harnesses branches from the main line harness and an improvement in reliability of electric connection at the branching portion.

What is claimed is:

1. A branching structure configured to connect a main line harness and a branch line harness to each other, the main line harness having a plurality of main lines arranged side by side, each of the main lines being configured as a wiring member having a rod conductor, and the branch line harness having a plurality of branch lines, the branching structure comprising:
connection terminals to be electrically connected to the main lines to form at least part of electrically conductive paths between the main lines and the branch lines; and
a circuit board on which the connection terminals are mounted;
wherein each of the connection terminals comprises a tubular connection portion having a tubular shape to cover an outer circumferential surface of the rod conductor,
wherein, as a pressing structure, the tubular connection portion has a press piece extending along a longitudinal direction of the tubular connection portion,
wherein the press piece is formed to connect with the tubular connection portion at a base end of the press piece, and to be separated from the tubular connection portion at a tip end of the press piece,
wherein, as the pressing structure, the press piece is configured such that the tip end of the press piece elastically presses the outer circumferential surface of the rod conductor placed inside a hollow portion of the tubular connection portion,
wherein the rod conductor is held between the press piece and an inner circumferential surface of the tubular connection portion,
wherein each of the main lines is separated to form a first separated main line including a first end portion, and a second separated main line including a second end portion,
wherein the first end portion is inserted into a first tubular connection portion, and the second end portion is inserted into a second tubular connection portion such that the first separated main line and the second separated main line are electrically connected to each other via corresponding connection terminals,
wherein a coupling plate portion is provided between the first tubular connection portion and the second tubular connection portion, the coupling plate portion coupling the first tubular connection portion and the second tubular connection portion with each other,
wherein a pin portion is formed on the coupling plate portion, the pin portion extending in a direction intersecting with a direction in which the plurality of main lines are arranged side by side, and
wherein the pin portion is inserted through a insertion hole formed in the circuit board, such that the first tubular connection portion and the second tubular connection portion are electrically connected to at least one of the plurality of branch lines via the circuit board.

2. The branching structure according to claim 1, further comprising:
a connector provided on the circuit board; and
a counterpart connector to be electrically connected to the branch lines,
wherein the connection terminals, the circuit board, the connector and the counterpart connector form the electrically conductive paths.

3. The branching structure according to claim 2, wherein the pressing structure abuts against a surface of the circuit board.

4. The branching structure according to claim 1, wherein the connection terminals comprise bus bars extending from the tubular connection portions, and
wherein the branching structure further comprises:
a connector provided at end portions of the bus bars; and
a counterpart connector to be electrically connected to the branch lines,
wherein the connection terminals, the connector and the counterpart connector form the electrically conductive paths.

5. The branching structure according to claim 1, wherein each main line includes an insulator covering the rod conductor,
the insulator is removed at an end portion of each divided part of the main line, and
the end portion of each divided part of the main line from which the insulator has been removed is electrically connected to a respective connection terminal.

6. The branching structure according to claim 1, wherein each of the tubular connection portions includes a contact plate portion formed into a U-shape, and includes a flat press plate portion, and
the pressing structure is formed in the flat press plate portion.

7. The branching structure according to claim 6, wherein the flat press plate portion includes a plate thickness that is greater than another plate thickness of the contact plate portion.

8. The branching structure according to claim 6, wherein the rod conductor includes an outer diameter that is equal to an internal diameter of the contact plate portion.

9. The branching structure according to claim 6, wherein the rod conductor includes an outer diameter that is greater than an internal diameter of the contact plate portion.

10. The branching structure according to claim 1, wherein the rod conductor includes a lock groove that is formed circumferentially at an end portion of the main line, and
the pressing structure includes a lock end that is configured to enter the lock groove.

11. The branching structure according to claim 1, wherein pressing structures of adjacent connection terminals are butted against each other via an insulating member.

12. The branching structure according to claim 1, wherein the first separated main line and the second separated main line are electrically connected to each other via the corresponding connection terminals to form a planar wiring route.

13. The branching structure according to claim 1, wherein the first separated main line and the second separated main line are electrically connected to each other via the corresponding connection terminals to form a bent wiring route.

14. The branching structure according to claim 1, wherein the connection terminals have a plurality of pairs of connection terminals.

15. The branching structure according to claim 1, wherein the connection terminals are electrically conductive.

16. A wire harness comprising:
a main line harness to be arranged on a body of a vehicle, the main line harness comprising a plurality of main lines arranged side by side, each of the main lines being configured as a wiring member having a rod conductor, and one of the main lines being a power supply line having a predetermined current capacity;
a branch line harness to be connected to electrical components mounted on the vehicle, the branch line harness comprising a plurality of branch lines; and
a control box arranged to distribute electric power fed to the power supply line of the main line harness to the branch line harness to be connected to the main line harness,
wherein the control box comprises a branching structure configured to connect the main line harness and the branch line harness to each other,
wherein the branching structure comprises connection terminals to be electrically connected to the main lines to form at least part of electrically conductive paths between the main lines and the branch lines, and circuit board on which the connection terminals are mounted,
wherein each of the connection terminals comprises a tubular connection portion having a tubular shape to cover an outer circumferential surface of the rod conductor,
wherein, as a pressing structure, the tubular connection portion has a press piece extending along a longitudinal direction of the tubular connection portion,
wherein the press piece is formed to connect with the tubular connection portion at a base end of the press piece, and to be separated from the tubular connection portion at a tip end of the press piece,
wherein, as the pressing structure, the press piece is configured such that the tip end of the press piece elastically presses the outer circumferential surface of the rod conductor placed inside a hollow portion of the tubular connection portion,
wherein the rod conductor is held between the press piece and an inner circumferential surface of the tubular connection portion,
wherein each of the main lines is separated to form a first separated main line including a first end portion, and a second separated main line including a second end portion,
wherein the first end portion is inserted into a first tubular connection portion, and the second end portion is inserted into a second tubular connection portion such that the first separated main line and the second separated main line are electrically connected to each other via corresponding connection terminals,
wherein a coupling plate portion is provided between the first tubular connection portion and the second tubular connection portion, the coupling plate portion coupling the first tubular connection portion and the second tubular connection portion with each other,
wherein a pin portion is formed on the coupling plate portion, the pin portion extending in a direction intersecting with a direction in which the plurality of main lines are arranged side by side, and
wherein the pin portion is inserted through a insertion hole formed in the circuit board, such that the first tubular connection portion and the second tubular connection portion are electrically connected to at least one of the plurality of branch lines via the circuit board.

17. The wire harness according to claim 16, wherein the connection terminals have a plurality of pairs of connection terminals.

18. The wire harness according to claim 16, wherein the connection terminals are electrically conductive.

* * * * *